US005772381A

United States Patent [19]

Olvera et al.

[11] Patent Number: 5,772,381

[45] **Date of Patent: *Jun. 30, 1998**

[54] ATTACHMENT PLATE FOR INSULATION PANELS

[75] Inventors: Gilbert Olvera, Chicago; Michael C. Dill, Elk Grove Village, both of Ill.

[73] Assignee: Illinois Tool Works Inc., Glenview, Ill.

[ * ] Notice: The term of this patent shall not extend beyond the expiration date of Pat. No. 5,607,242.

[21] Appl. No.: 708,444

[22] Filed: Sep. 5, 1996

Related U.S. Application Data

[62] Division of Ser. No. 369,354, Jan. 6, 1995, Pat. No. 5,607,272.

[51] Int. Cl.[6] .......... F16B 43/00

[52] U.S. Cl. .......... 411/533; 411/368; 411/531; 411/542; 52/410; 52/512

[58] Field of Search .......... 227/8–10; 411/531, 411/533, 542, 544, 368, 369, 440, 441; 52/410, 512

[56] References Cited

U.S. PATENT DOCUMENTS

| | | | |
|---|---|---|---|
| 2,307,348 | 1/1943 | Anderson . | |
| 2,334,406 | 11/1943 | Gray . | |
| 2,769,333 | 11/1956 | Reintjes . | |
| 3,341,101 | 9/1967 | Butler et al. | 227/10 |
| 3,348,751 | 10/1967 | Henning | 227/10 |
| 3,473,718 | 10/1969 | Wackrow | 227/10 |
| 3,559,272 | 2/1971 | Hsu | 227/10 |
| 4,361,997 | 12/1982 | De Caro . | |
| 4,380,413 | 4/1983 | Dewey . | |
| 4,545,270 | 10/1985 | Dewey . | |
| 4,595,134 | 6/1986 | Jochum | 227/10 |
| 4,606,168 | 8/1986 | Fuhrer . | |
| 4,630,984 | 12/1986 | Reinwall et al. . | |
| 4,663,910 | 5/1987 | Hasan . | |
| 4,703,883 | 11/1987 | Losada | 227/9 |
| 4,712,959 | 12/1987 | Hasan . | |
| 4,757,661 | 7/1988 | Hasan . | |
| 4,773,581 | 9/1988 | Ohtsu et al. | 227/10 |
| 4,862,664 | 9/1989 | Romine . | |
| 4,884,932 | 12/1989 | Meyer . | |
| 4,932,819 | 6/1990 | Almeras . | |
| 4,959,938 | 10/1990 | De Caro . | |
| 5,054,983 | 10/1991 | Froewis et al. . | |
| 5,066,181 | 11/1991 | Bogel . | |
| 5,069,340 | 12/1991 | Ernst et al. . | |
| 5,082,412 | 1/1992 | Thomas . | |
| 5,090,606 | 2/1992 | Torii et al. | 227/10 |
| 5,118,235 | 6/1992 | Dill . | |
| 5,122,022 | 6/1992 | Kluser . | |
| 5,171,118 | 12/1992 | Rothenbuhler . | |
| 5,217,339 | 6/1993 | O'Connor et al. . | |
| 5,255,485 | 10/1993 | Lemke et al. . | |

*Primary Examiner*—Rodney M. Lindsey
*Assistant Examiner*—Tuyet-Phuong Pham
*Attorney, Agent, or Firm*—Schwartz & Weinrieb

[57] ABSTRACT

An attachment plate is used to attach insulation panels to building substrates using internal combustion cordless nail setting tools loaded with collating strips for feeding and holding nails in the tool magazine. The attachment plate has a washer and an annular chamber at a first end. A wall of the annular chamber is defined by a band of fingers. The interior of the attachment plate has a recess. The attachment plate second end has flexible tabs. The attachment plate is placed on a pilot and against a flange of a tool adapter. The attachment plate is pushed into the insulation panel such that the tool muzzle bends the fingers and passes through the same. When the tool is fired, a nail and nail collating ring are forced into and captured within the recess. The tabs bend against the substrate if the insulation panel is of less than nominal thickness.

20 Claims, 6 Drawing Sheets

ATTACHMENT PLATE FOR INSULATION PANELS

This application is a division of application Ser. No. 08/36 9354, filed Jan. 6,1995 now U.S. Pat. No. 5607272.

BACKGROUND OF THE INVENTION

1. Field of the Invention

This invention pertains to building construction, and more particularly to apparatus for attaching insulation panels to structural substrates.

2. Description of the Prior Art

Many types of buildings include compressible insulation panels attached to structural substrates. The insulation panels are typically attached in place by mechanical fasteners such as screws or nails in conjunction with specialized attachment. devices. The attachment devices are commonly thin plates having relatively large areas. The plates are placed on the insulation panel surface which is disposed opposite the surface of the panel which is disposed in contact with the substrate, and the fasteners are driven through the plates and insulation panel into the substrate.

The process of attaching insulation panels to buildings has traditionally been slow and costly. If screws are used as the fasteners, holes must be predrilled into the-masonry or other substrate. Self-drilling screws require time for drilling and tapping. Further, the screws must be fed individually into the front of an electric screw gun tool. With powder driven nails as the fasteners, the nails and powder loads must be fed individually or in small numbers, usually by hand, into the power setting tool.

Examples of prior insulation panel attachment devices may be seen in U.S. Pat. 2,307,348; 4,380,413; 4,545,270; 4,606,168; and 4,862,664. The attachment devices of the foregoing patents do not pass completely through an insulation panel from its exposed surface to the substrate. Consequently, it is difficult to consistently apply the correct amount of force to the fasteners. If too little force is applied, the plate portions of the attachment devices will project improperly above the exposed surface of the insulation panel. In addition, the fasteners will not be sufficiently embedded into the substrate, so they will have a tendency to work loose. If too much force is applied to the attachment devices, they will penetrate excessively into the insulation panels.

U.S. Pat. Nos. 5,054,983 and 5,171,118 show insulation panel attachment devices that pass entirely through insulation panels. These attachment devices can thus clamp insulation panels to a substrate with a uniform force. On the other hand, these devices of the two patents suffer the drawback of being unable to accommodate insulation panels having thicknesses that vary from a nominal thickness. Further, the devices of the foregoing patents require installation by power setting tools that require individual feeding of the nails and the powder loads. Consequently, installation times are undesirably high.

SUMMARY OF THE INVENTION

In accordance with the present invention, an attachment plate for insulation panels is provided that greatly increases the productivity of attaching insulation panels to buildings. This is accomplished by designing the attachment plate such that the plate is able to be installed using a combustion powered repeating type setting tool and to accommodate insulation panels of varying thickness.

The attachment plate extends along a longitudinal axis between first and second ends. At the first end is a flat washer of relatively large area. The plane of the washer is perpendicular to the longitudinal axis. The washer has a central opening therethrough of a first diameter. The first diameter is sized to snugly accept an adapter of an internal combustion cordless nail setting tool that is loaded with nails held in collating strips.

A tubular member having sections of varying diameters and lengths extends concentrically about the longitudinal axis and is joined to the attachment plate second end. A first section of the tubular member has generally the same inner diameter as the washer central opening but a smaller outer diameter. The length of the inner diameter portion of the tubular member first section is sufficient to axially guide the tool adapter. The first tubular section inner diameter terminates in an annular surface transverse to the longitudinal axis.

A second section of the tubular member extends from the first section toward the attachment plate second end. The second section defines a recess that has an inner diameter and an axial length which are sized to accept a nail collating ring. A third section of the tubular member has a passage with an inner diameter and an axial length which are suitable for accepting and guiding the shank of a nail. The outer diameter of the third section is frustoconical. A fourth section of the tubular member has a cylindrical outer diameter and a relatively thin wall. The passage of the third section continues through the fourth section. The fourth section has two or more transverse slots therethrough such that the fourth section is in the form of tabs.

Upstanding from the transverse surface at the end of the inner diameter of the tubular member first section is a band of double fingers. The double fingers are fabricated as a plurality of first fingers having respective first ends that are bendably joined to the transverse surface. The first fingers extend toward the first end of the attachment plate and are disposed concentrically about the longitudinal axis of the attachment plate, where they terminate in respective second ends. The band of first fingers has an outer diameter that is spaced from the inner diameter of the tubular member first section so as to form an annular chamber there between. The interior of the band of first fingers defines a central counterbore. A second finger is bendably joined at a first end thereof to the second end of each first finger. The second fingers extend radially inwardly toward the longitudinal axis so as to bendably close the counterbore.

It is a feature of the present invention that the attachment plate can accommodate insulation panels having thicknesses different than a nominal thickness. If the insulation panel thickness is slightly less than nominal, the attachment plate second end contacts the substrate before the washer is flush with the exposed surface of the panel. Upon firing the tool, the nail forces the attachment plate fully into the panel by bending the tabs the amount necessary to assure that the installed attachment plate does not protrude above the panel exposed surface of the panel. If the panel has a slightly greater thickness than nominal, the attachment plate second end is spaced from the substrate when the attachment plate washer is flush with the exposed surface of the panel. When the tool is fired, the nail forces the washer to penetrate the panel a slightly further amount until the attachment plate second end contacts the substrate. In that situation, the tabs do not bend.

The method and apparatus of the invention, using a multi-section attachment plate, thus enables insulation panels to be very rapidly and easily installed on a building using a repeating impulse tool. The attachment plate also enables insulation panels of varying thicknesses to be installed with a consistent clamping force.

BRIEF DESCRIPTION OF THE DRAWINGS

Other advantages, benefits, and features of the present invention will become apparent to those skilled in the art upon reading the detailed description of the invention in conjunction with the accompanying drawings in which like reference characters designate like or corresponding parts throughout the several views, and wherein.

DETAILED DESCRIPTION OF THE INVENTION

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figure 1:
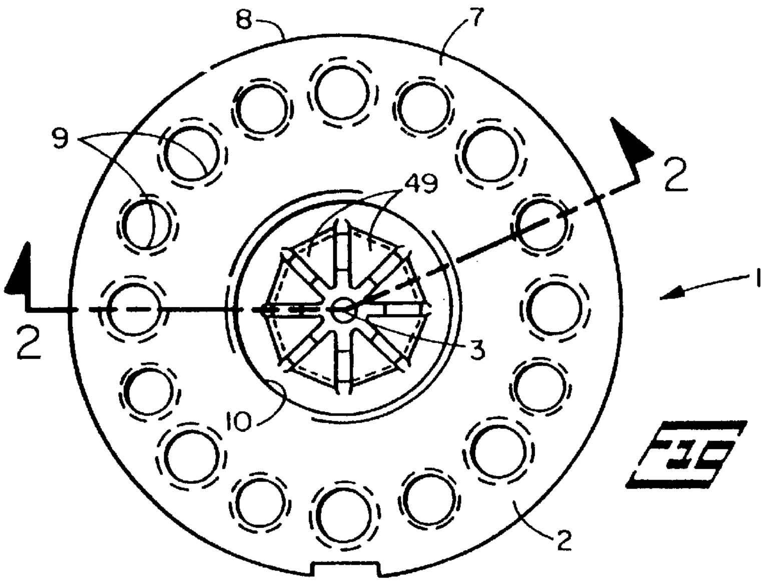
FIG. 1 is a top view of the attachment plate of the present invention.
Figure 2:
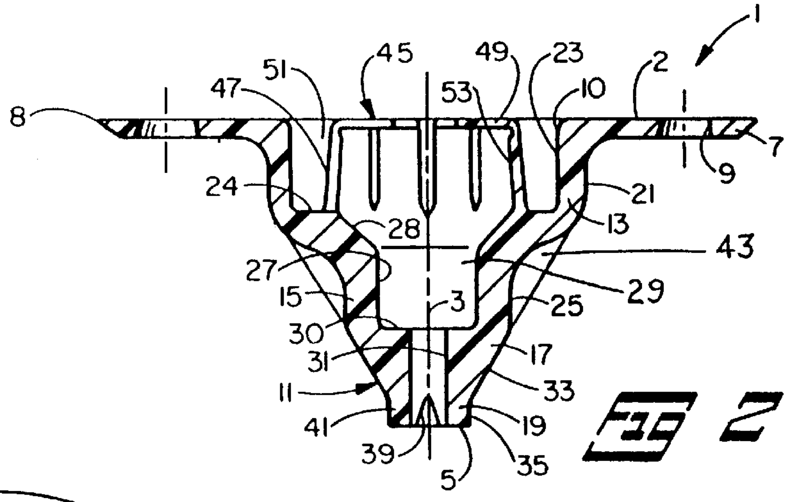
FIG. 2 is a cross sectional view taken along line 2—2 of FIG. 1.
Figure 3:
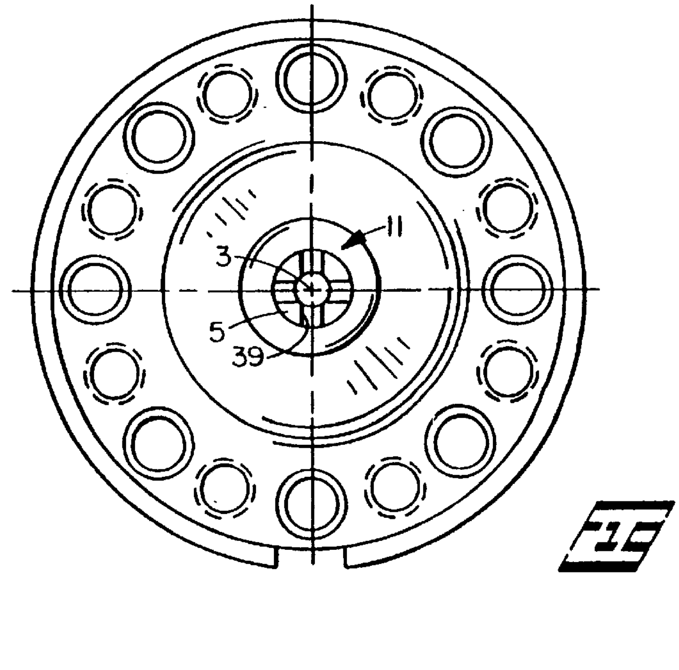
FIG. 3 is a bottom view of the attachment plate.

Referring to FIGS. 1–3, an attachment plate 1 for insulation panels as illustrated comprises the present invention. The attachment plate 1 is constructed as a tubular piece that is symmetrical about a longitudinal axis 3 and that has first and second ends 2 and 5, respectively. At the plate first end 2 is a washer 7 of relatively large outer diameter 8 and having a central opening 10. A number of openings pass through the washer 7. The openings may be in the form of holes 9 having frusto-conical cross sections, with the holes having their apexes toward the attachment plate first end 2. The holes 9 provide flexibility to the washer.

Joined to the washer 7 and extending toward the attachment plate second end 5 is a tubular member 11. In the preferred embodiment, the tubular member 11 has four sections 13, 15, 17, and 19. The first section 13 has an outer diameter 21 that is substantially smaller than the washer outer diameter 8. The first section has an inner diameter 23 that is the same size as the diameter of the washer central opening 10. The inner diameter 23 terminates in a first annular transverse surface 24.

The second section 15 of the tubular member 11 has an outer diameter 25 that preferably is less than the outer diameter 21 of the first section 13 and an inner diameter 27 that is less than the first section inner diameter 23. The second section inner diameter 27 is smoothly connected to the transverse surface 24 of the first section 13 through a dished transition surface 28. The second section inner diameter 27 terminates in a second transverse surface 30. The inner diameter 27 and transverse surface 30 cooperate to define a recess 29 that is sized to accept a nail collating ring, as will be explained presently.

The third section 17 has a frusto-conical outer diameter 33. The third section 17 defines an internal passage 31 that is sized to guide a nail.

The fourth section 19 has a cylindrical outer diameter 35. The passage 31 continues through the fourth section 19. The fourth section 19 has a thin wall. Several slots 39, which may be four in number, are cut transversely through the fourth section 19 wall so as to form tabs 41.

Upstanding from the transverse surface 24 is a band of double fingers 45. Each double finger 45 has a first finger 47 having a first end joined by a living hinge to the transverse surface 24 and a second end that is approximately coplanar with the attachment plate first end 2. The first fingers 47 converge slightly toward the attachment plate first end 2. A second finger 49 is bendably joined by a living hinge at a first end thereof to the second end of each respective first finger 47. The second fingers 49 are generally triangular in shape, as best shown in FIG. 1. The second fingers 49 extend radially inwardly toward the longitudinal axis 3, and they lie in a transverse plane generally coplanar with the attachment plate first end 2. The first fingers 47, the,washer central opening 10, the inner diameter 23, and the transverse surface 24 cooperate to form an annular chamber 51 having a generally rectangular cross section when viewed from the side. The first fingers 47 also define a central counterbore 53, which is normally closed by the second fingers 49. For maximum flexibility and resistance to thermal conductivity, the attachment plate 1 is preferably made from a thermoplastic material.

Figure 4:
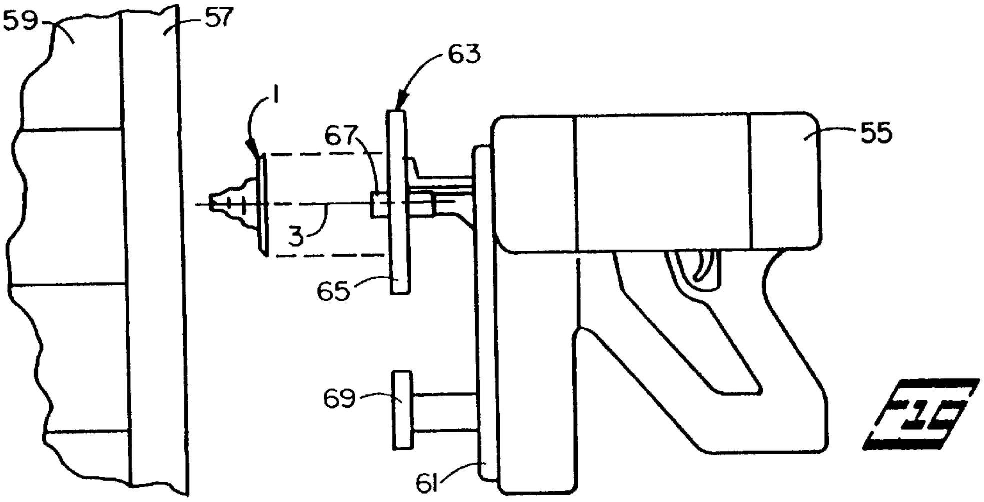
FIG. 4 is an exploded view showing a repeating impulse nail setting tool for attaching an insulation panel to a building substrate using the attachment plate of the present invention.
Figure 5:
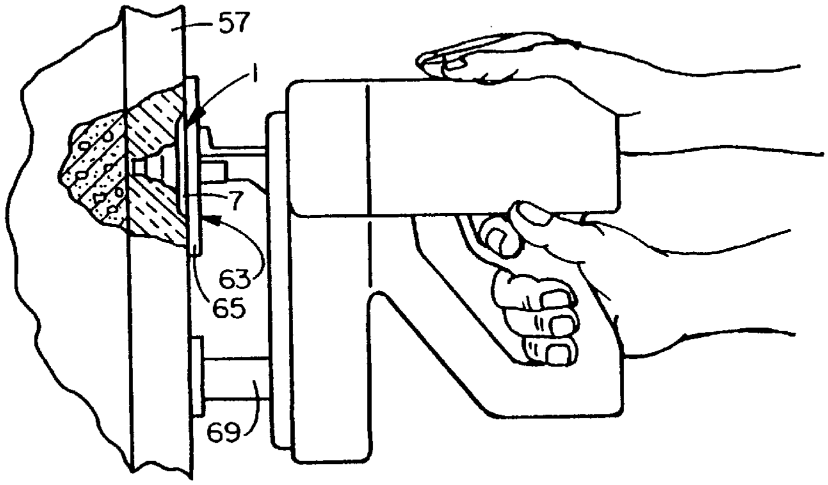
FIG. 5 is a partial sectional view similar to FIG. 4, showing the attachment plate partially installed within the insulation panel.

Now turning to FIGS. 4 and 5, a tool 55 is shown that is used to attach an insulation panel 57 to a building substrate 59 by means of the attachment plate 1. The substrate 59 can be any structure found in the construction industry, such as concrete, masonry, wood, or steel. A major benefit of the present invention is that the tool 55 is an internal combustion power nail setting tool commonly used to fasten wood and light gauge metal. An exemplary setting tool is manufactured and marketed by Illinois Tool Works of Glenview, Ill., under the trademarks TRAKFAST and IMPULSE. Those tools have collated nail magazines and fuel canisters for providing power. The collating features a plastic strip such as is shown in U.S. Pat. No. 5,069,340 used for feeding and holding nails in the tool magazine. The plastic collating material holds a nail as it is fired from the tool and acts as a clamping washer when installing the attachment plate 1 to the substrate 59. The power setting tool 55 enables rapid, continuous, and consistent operation until the nail magazine is empty.

Secured to the power setting tool 55 is a plate 61. An adapter 63 is mounted upon the plate 61 concentric with the tool muzzle, not shown in FIGS. 4 or 5. The adapter 63 is spring loaded by a known mechanism so as to be able to reciprocate relative to the tool 55 along the axis 3. The adapter 63 has a stabilizing flange 65 and a pilot 67. The stabilizing flange 65 preferably has an area greater than the area of the attachment plate washer 7. The adapter pilot 67 has an outer diameter that is sized to fit snugly inside the inner diameter 23 of the adapter plate 1 (FIG. 2). On the end of the plate 61 opposite the adapter 63 is a rest 69.

Figure 6A:
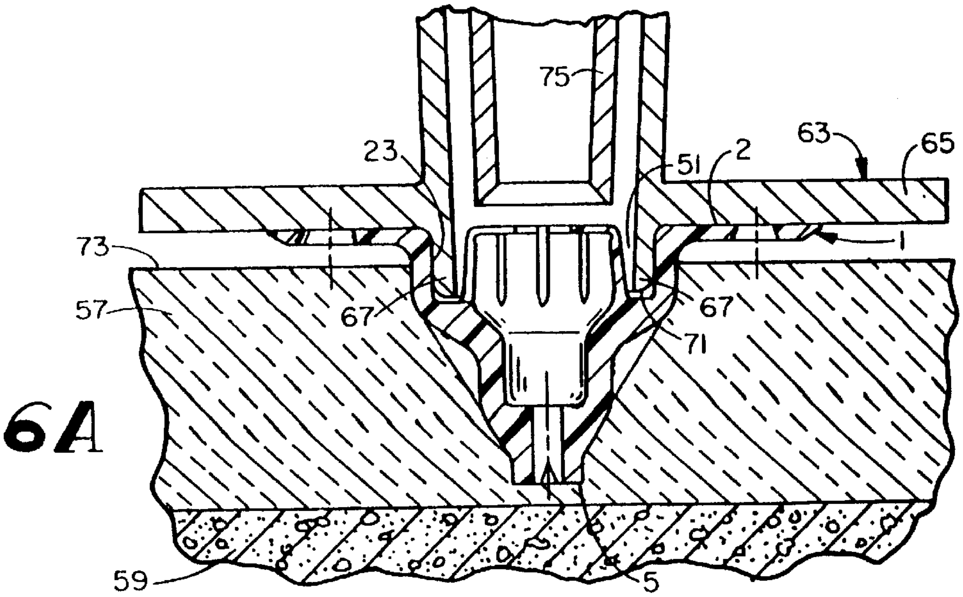
FIGS. 6A–6D are longitudinal cross sectional views of the attachment plate and a portion of the nail setting tool during various stages of the installation of the attachment plate.

A worker places an attachment plate 1 on the adapter 63 by inserting the adapter pilot 67 into the adapter plate annular chamber 51 until the stabilizing flange 65 abuts the plate washer 7. Also see FIG. 6A. For easy installation, the free end of the pilot is formed with an external chamfer or arcuate surface 71. Friction between the pilot outer diameter and the adapter plate inner diameter 23 holds the attachment plate 1 in place on the adapter 63.

Figure 6B:
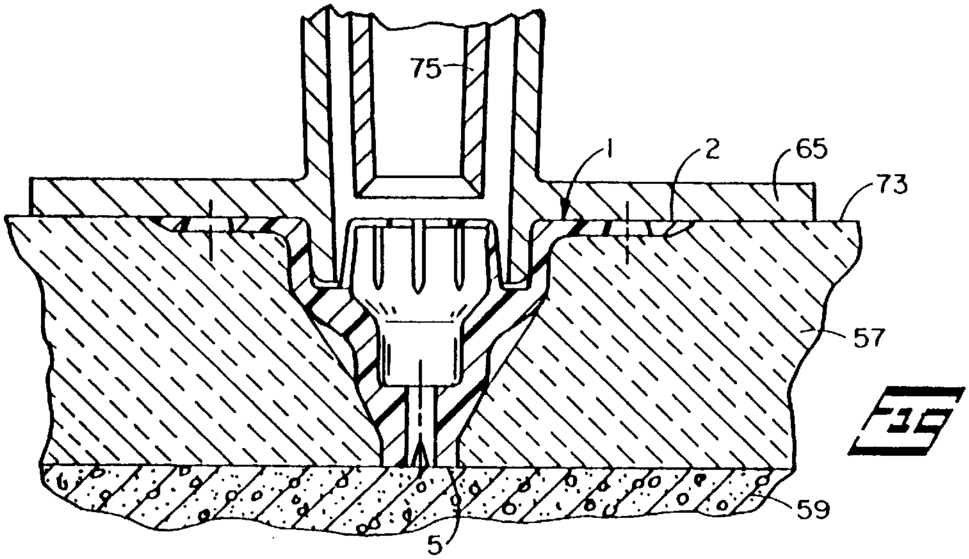

The worker aligns the attachment plate 1 with the desired location on the insulation panel 57. He then manually pushes the tool 55 and attachment plate 1 such that the attachment plate second end 5 penetrates the insulation panel 57. Fins 43 mounted upon second section 15 and extending between first section 13 and third section 17 cut the insulation panel 57 and aid in the penetration process. Manual pushing continues until the adapter stabilizing flange 65 and the rest 69 contact the exposed surface 73 of the insulation panel 57, FIG. 6B. At that point, the attachment plate first end 2 is flush with the exposed surface 73 of the insulation panel 57, and the attachment plate second end 5 is in contact with the building substrate 59.

Figure 6C:
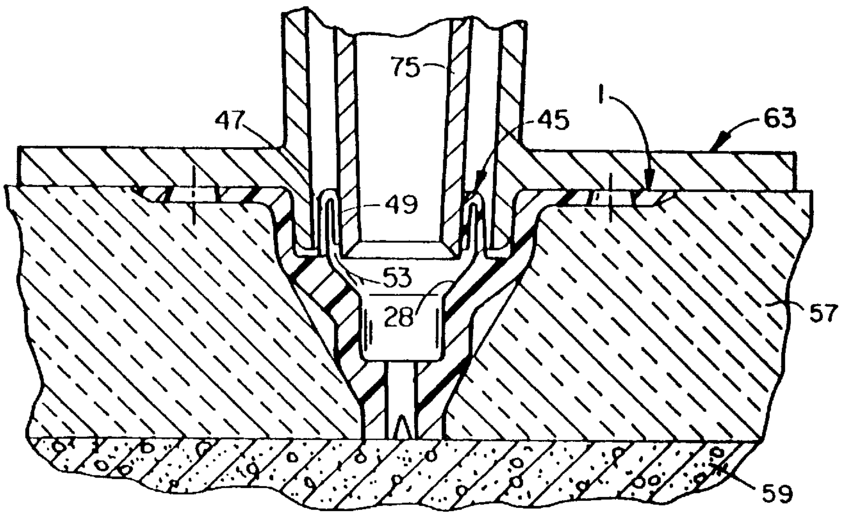
Figure 6D:
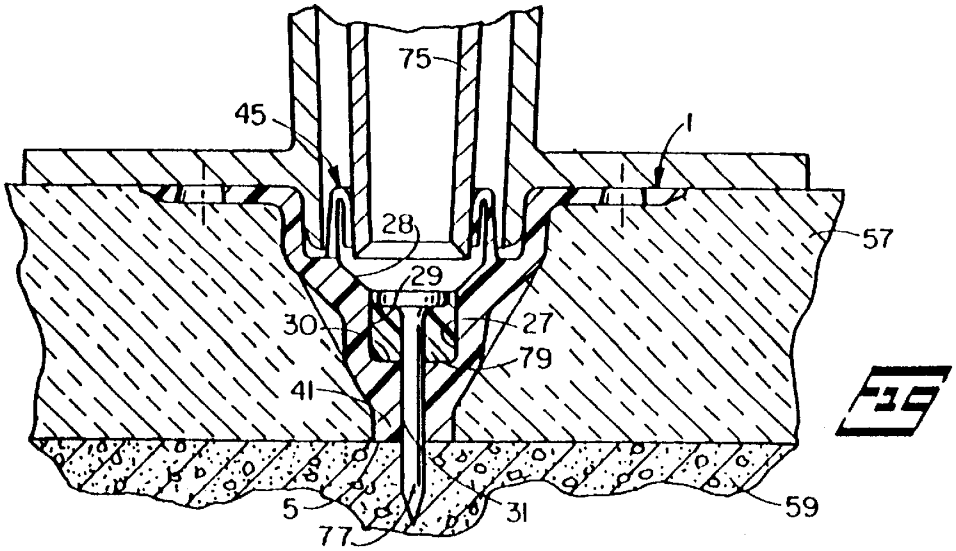

The worker continues to push the tool 55 toward the insulation panel 57. That action causes the tool 55, including its muzzle 75, to move toward the attachment plate 1 relative to the adapter 63, FIG. 6C. The tool muzzle 75 advances to contact the second fingers 49 of the double fingers 45. The muzzle 75 bends the second fingers 49 downwardly into the counterbore 53 and flat against the first fingers 47. Simultaneously, the first fingers 47 bend slightly outwardly. The tool advances until the muzzle end 75 is close to the adapter plate dished surface 28. At that point, the tool 55 bottoms out relative to the adapter 1. Simultaneously, the motion of the tool 55 relative to the adapter 1 energizes the tool electronic firing system through the adapter spring loaded mounting system. The workman is then able to fire the tool. A driving ram in the muzzle, not shown in FIG. 6D, passes through the tool muzzle 75 to force a collating ring 79 and a nail 77 into the recess 29 of the attachment plate 1. The collating ring 79 becomes compressed within the recess 29 and locks to the attachment plate 1 around the nail 77 by radial compression and frictional forces of the recess internal diameter 27. The nail 77 passes through the passage 31 and becomes embedded in the substrate 59, thus installing the attachment plate 1 to the substrate 59 and clamping the associated region of the insulation panel 57 to the substrate 59. The first fingers 47 absorb shock from the tool 55 during firing and lessen any potential damage to the second fingers 49, which are bent over by and in contact with the muzzle 75.

Figure 7:
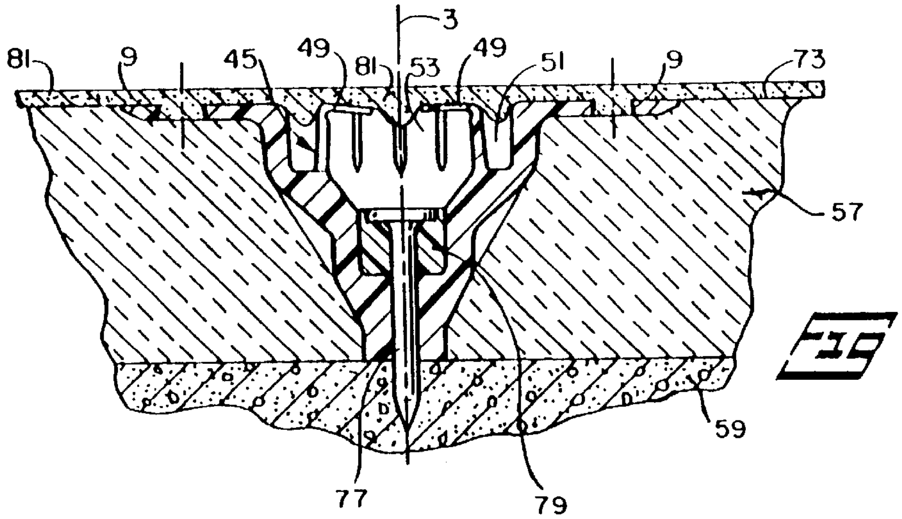
FIG. 7 is a cross sectional view of the attachment plate installed upon a building substrate.

When the tool 55 and adapter 63 are removed from the installed attachment plate 1, the fingers 45 bend back to their undeflected positions. See FIG. 7. The worker then plates another attachment plate on the adapter pilot 67 of his tool 55 for immediate attachment at another location on the insulation panel 57.

Later, a series of coatings 81 are spread on the exposed surface 73 of the insulation panel 57 to provide solid wall foundation and texture. The double fingers 45 act to seal the counterbore 53 from excessive coating penetration and adhesion. Any coating 81 that does enter the counterbore 53 serves to anchor the adjacent coating and enable it to resist outward and shear forces. Some coating material also enters the annular chamber 51 and fills the holes 9 in the washer 7 to provide additional adhesion of the coating over the insulation panel 57. Consequently, the finished surface of the building wall provides a smooth and dimple free appearance as well as a strong bond to the insulation panel 57.

Figure 8:
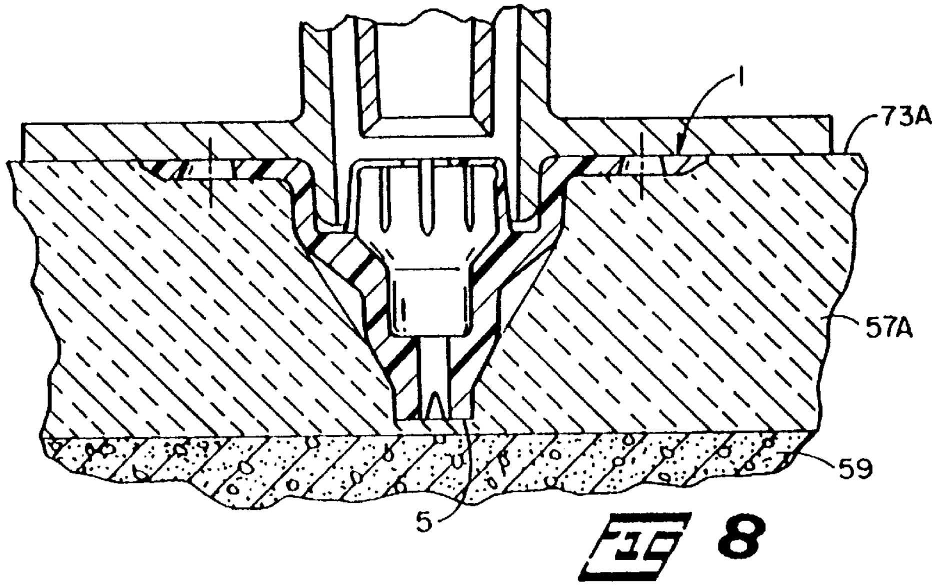
FIGS. 8 and 8A are views similar to FIGS. 6A and 6D, respectively, but showing the attachment plate in conjunction with an insulation panel of greater than nominal thickness.
Figure 8A:
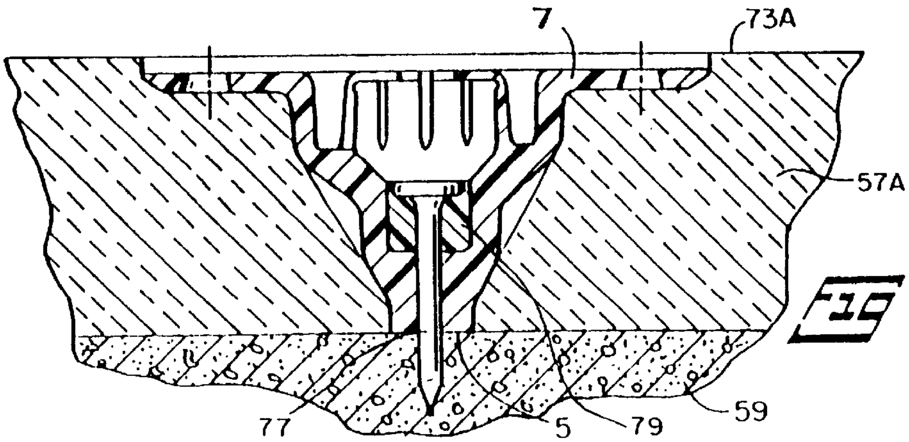

Further in accordance with the present invention, the attachment plate is capable of accommodating insulation panels of varying thicknesses. Looking at FIG. 8, an insulation panel 57A has a thickness greater than the nominal thickness of the insulation panel 57 of FIGS. 4–7. Consequently, when the worker has fully embedded the attachment plate 1 into the insulation panel 57A with his tool 55, the second end 5 of the attachment plate 1 does not contact the substrate 59. When the worker fires the tool, the force of the driving ram on the nail 77 will further embed the attachment plate 1 into the insulation panel 57A such that the attachment plate second end 5 does contact the substrate 59. As a result, the attachment plate washer 7 comes to rest below the exposed surface 73A of the insulation panel 57, FIG. 8A.

Figure 9:
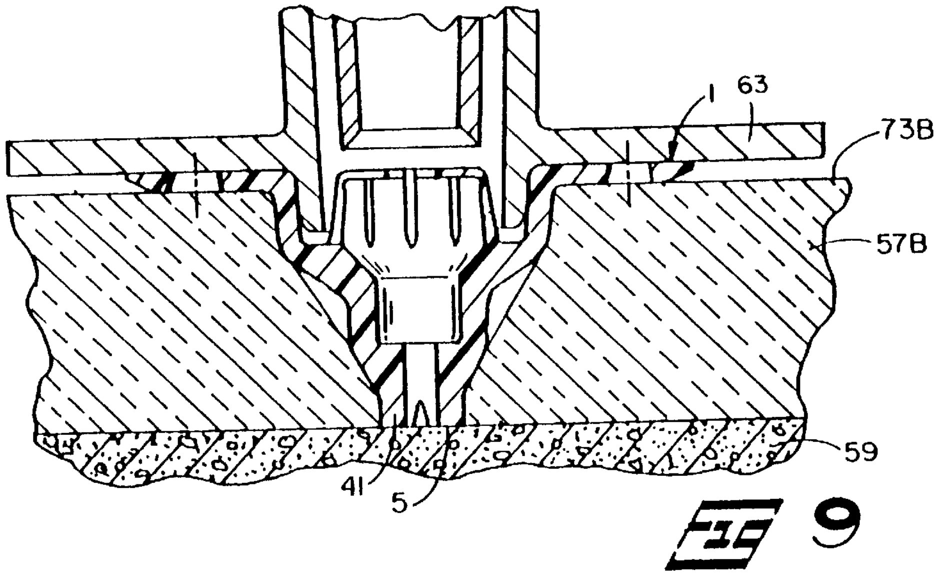
FIGS. 9 and 9A are views similar to FIGS. 8 and 8A, respectively, but showing the attachment plate in combination with an insulation panel of less than nominal thickness.
Figure 9A:
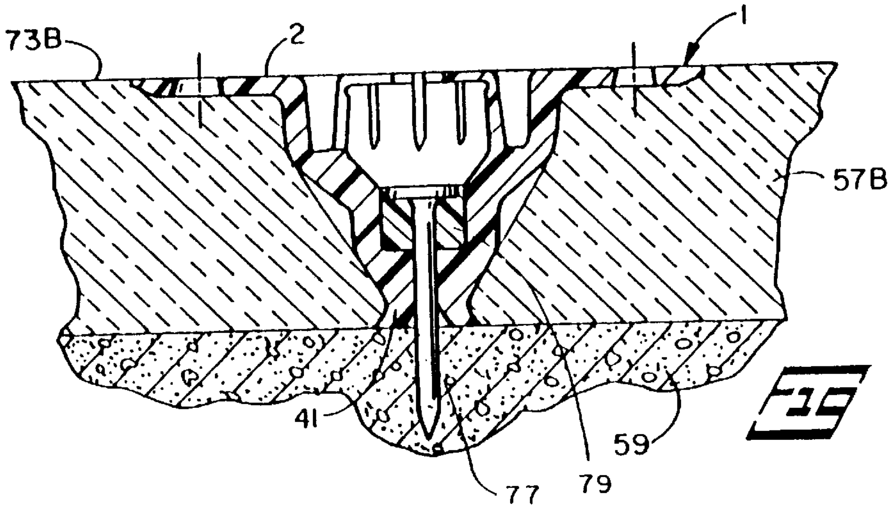

In FIG. 9, the insulation panel 57B has a thickness less than the nominal thickness of the insulation panel 57 of FIGS. 4–7. In this situation, the second end 5 of the attachment plate 1 contacts the substrate 59 before the adapter 63 of the setting tool 55 contacts the exposed surface 73B of the insulation panel 57B. Upon firing the setting tool 55, the driving ram forces the attachment plate tabs 41 to bend radially outwardly until outer surface of the attachment plate first end 2 is flush with the exposed surface 73B of the insulation panel 57B, FIG. 9A. In this manner, the outer surface of the attachment plate first end 2 does not protrude above the exposed surface 73B of the insulation panel 57B. Rather, the outer surface of the attachment plate first end 2 is always flush with or slightly below the exposed surface 73B of the insulation panel 57B.

Figure 10:
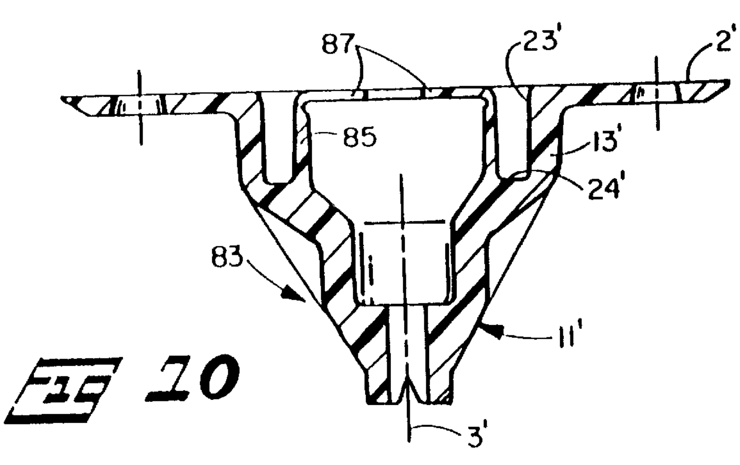
FIG. 10 is a longitudinal cross sectional view of a modified embodiment of the attachment plate of the present invention.

Looking at FIG. 10, a modified attachment plate 83 is depicted that is generally similar to the attachment plate 1 described above in conjunction with FIGS. 1–9. However, the attachment plate 83 is fabricated with a solid thin cylindrical band 85 upstanding from the transverse surface 24' at the end of the inner diameter 23' of the first section 13' of the tubular member 11'. At the free end of the solid band 85 are joined several fingers 87. The fingers 87 are bendable by respective living hinges to the band 85. The fingers 87 extend radially inwardly toward the longitudinal axis 3' and lie generally coplanar with the attachment plate first end 2'. In all other respects, the attachment plate 83 is identical to the attachment plate 1.

Figure 11:
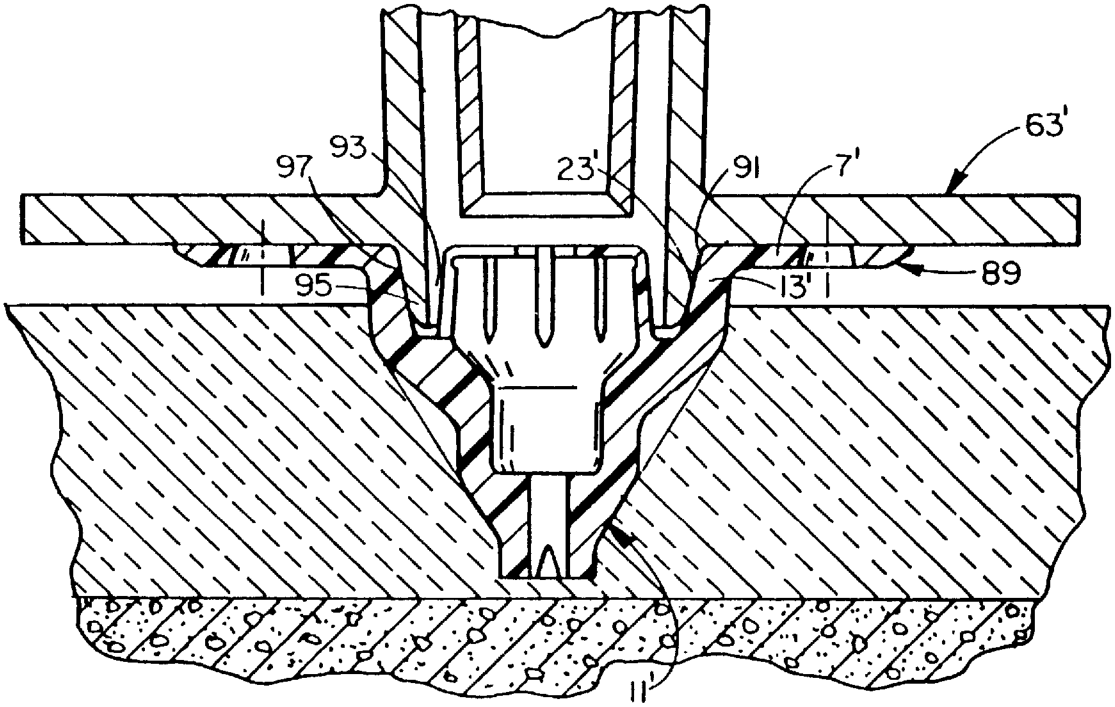
FIG. 11 is a longitudinal cross sectional view of a further modified embodiment of the attachment plate of the present invention.

FIG. 11 shows a further modified attachment plate 89. The attachment plate 89 has a frusto-conical surface 91 for the central opening of the washer 7' and for the inner diameter 23' of the first section 13' of the tubular member 11'. Accordingly, the cross section of the annular chamber 93 has a generally triangular shape. To interfit with the attachment plate 89, the pilot 95 of the setting tool adapter 63' has a frusto-conical exterior surface 97.

Thus, it is apparent that there has been provided, in accordance with the invention, an attachment plate for insulation panels that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as they may fall within the spirit and broad scope of the appended claims.

We claim:

1. Apparatus for attaching an insulation panel to a building substrate, comprising:

tool means, having a magazine for housing at least one strip of collated fasteners, and a nosepiece portion, for inserting at least one of said collated fasteners into a building substrate so as to attach an insulation panel to said building substrate; and an attachment plate having first and second ends disposed along a longitudinal axis and comprising a washer having a central opening of a predetermined diametrical extent provided at said first end of said attachment plate, and a tubular member joined to said washer and extending concentrically along said longitudinal axis between said first and second ends of said attachment plate;

said tubular member comprising a first section adjacent to said washer and including an inner peripheral wall which defines a first inner diametrical extent which is substantially the same as said diametrical extent of said washer central opening, said inner peripheral wall of said first section terminating in a first transverse surface; a second section adjacent to said first section and including an inner peripheral wall defining a second inner diametrical extent which is less than said first inner diametrical extent of said first section, said inner peripheral wall of said second section terminating in a second transverse surface that cooperates with said inner peripheral wall of said second section so as to define a recess for accommodating a head portion of a fastener which is adapted to be inserted into said building substrate so as to secure said insulation panel to said building substrate; an end section adjacent to said second section and defining a passage therethrough for accommodating a shank portion of said fastener for securing said insulation panel to said building substrate; and finger means, spaced radially inwardly from said inner peripheral wall of said first section and mounted upon said first transverse surface of said first section, for forming an annular chamber with said inner peripheral wall of said first section so as to accommodate said nosepiece portion of said tool means and thereby enable said attachment plate to be mounted upon said nosepiece portion of said tool means, and for closing a central bore portion of said first section of said tubular member of said attachment plate so that said head portion of said fastener is substantially covered after said tool means has been fired and said fastener has been inserted into said building substrate so as to thereby install said insulation panel upon said building substrate as a result of said insulation panel being clamped between said attachment plate washer and said building substrate.

2.The apparatus of claim 1, further comprising:

a collating ring compressed and locked by radial compression and friction within said recess and circumferentially disposed about a portion of said shank portion of said fastener.

3. The apparatus of claim 1, wherein said finger means comprises:

a first set of fingers disposed parallel to and circumferentially about said longitudinal axis so as to define said.

4. Apparatus as set forth in claim 3, further comprising:

muzzle means, movably mounted upon said tool means so as to be movable with respect to said nosepiece portion of said tool means, for engaging said second set of fingers and bending said second set of fingers toward said first set of fingers so as to permit said tool means to open said central bore portion of said first section of said tubular member and force said fastener into and through said attachment plate and embed said fastener within said building substrate.

5. Apparatus as set forth in claim 3, wherein:

each one of said fingers of said second set of fingers has a configuration which is substantially that of a triangle wherein each one of said fingers of said second set of fingers is connected to a respective one of said first fingers along one side of said triangle while the other two sides of said triangle substantially mate with two similarly disposed sides of adjacent ones of said second fingers so as to substantially close and cover said central bore portion of said tubular member.

6. The apparatus of claim 1, wherein said finger means comprises:

a solid band disposed parallel to and circumferentially about said longitudinal axis so as to define said annular chamber. along with said inner peripheral wall of said section; and set of fingers bendably joined to said solid band and disposed within a plane which is substantially coplanar with said washer and which is transverse to said longitudinal axis so as to close said central bore portion of said first section of said tubular member and thereby cover said head portion of said fastener.

7. Apparatus as set forth in claim 6, further comprising:

muzzle means, movably mounted upon said tool means so as to be movable with respect to said nosepiece portion of said tool means, for engaging said set of fingers and bending said set of fingers toward said solid band so as to permit said tool means to open said central bore portion of said first section of said tubular member and force said fastener into and through said attachment plate and embed said fastener within said building substrate.

8. Apparatus as set forth in claim 6, wherein:

each one of said fingers of said set of fingers has a configuration which is substantially that of a triangle wherein each one of said fingers of said set of fingers is connected to said solid band along one side of said triangle while the other two sides of said triangle substantially mate with two similarly disposed sides of adjacent ones of said fingers so as to substantially close and cover said central bore portion of said tubular member.

9. The apparatus of claim 1, wherein:

said end section of said attachment plate comprises a plurality of slots defining a plurality of flexible tabs such that if the axial extent of said tubular member of said attachment plate is greater than the thickness of said insulation panel, said flexible tabs will be bent against said building substrate, when said tool means is fired so as to insert said at least one fastener into said building substrate, so as to permit an outer surface portion of said washer to be substantially coplanar with an outer surface portion of said insulation panel.

10. Apparatus as set forth in claim 1, wherein said tool means further comprises:

flange means for engaging said washer of said attachment plate such that when said tool means is moved toward said building substrate and said attachment plate is mounted upon said nosepiece portion of said tool means, said flange means will cause said washer of said attachment plate to be embedded within an outer surface portion of said insulation panel.

11. Apparatus as set forth in claim 10, wherein:

said flange means is integral with said nosepiece portion of said tool means.

12. Apparatus as set forth in claim 10, wherein said tool means further comprises:

a rest having a surface, for engaging said outer surface portion of said insulation panel, which is substantially coplanar with said flange means such that when said flange means engages said outer surface portion of said insulation panel and embeds said washer of said attachment plate within said outer surface portion of said insulation panel, said rest will likewise engage said outer surface portion of said insulation panel so as to cooperate with said flange means in stabilizing said tool means upon said insulation panel prior to firing of said tool means for insertion of a fastener within said building substrate.

13. Apparatus as set forth in claim 1, wherein:

said tool means comprises an internal combustion cordless nail setting tool.

14. Apparatus for attaching an insulation panel to a building substrate, comprising:

a fastener setting tool, having a magazine for housing at least one strip of collated fasteners, and a nosepiece portion, for inserting at least one of said collated fasteners into a building substrate so as to attach an insulation panel to said building substrate; and an attachment plate having first and second ends disposed, along a longitudinal axis and comprising a washer having a central opening of a predetermined diametrical extent provided at said first end of said attachment plate, and a tubular member joined to said washer and extending concentrically along said longitudinal axis between said first and second ends of said attachment plate;

said tubular member comprising a first tubular section adjacent to said washer and including an inner peripheral wall which defines a first inner diametrical extent which is substantially the same as said diametrical extent of said washer central opening, said inner peripheral wall of said first tubular section terminating in a first transverse surface; a second tubular section adjacent to said first tubular section and including an inner peripheral wall defining a second inner diametrical extent which is less than said first inner diametrical extent of said first tubular section, said inner peripheral wall of said second tubular section terminating in a second transverse surface that cooperates with said inner peripheral wall of said second tubular section so as to define a recess for accommodating a head portion of a fastener which is adapted to be inserted into said building substrate so as to secure said insulation panel to said building substrate; a third tubular section adjacent to said second tubular section and defining a passage therethrough for accommodating a shank portion of said fastener for securing said insulation panel to said building substrate; and finger means, spaced radially inwardly from said inner peripheral wall of said first tubular section and mounted upon said first transverse surface of said first tubular section, for forming an annular chamber with said inner peripheral wall of said first tubular section so as to accommodate said nosepiece portion of said fastener setting tool and thereby enable said attachment plate to be mounted upon said nosepiece portion of said fastener setting tool, and for closing a central bore portion of said first tubular section of said tubular member of said attachment plate so that said head portion of said fastener is substantially covered after said fastener setting tool has been fired and said fastener has been inserted into said building substrate so as to thereby install said insulation panel upon said building substrate as a result of said insulation panel being clamped between said washer of said attachment plate and said building substrate.

15. The apparatus as set forth in claim 14, wherein said finger means comprises:

a first set of fingers disposed parallel to and circumferentially about said longitudinal axis so as to define said annular chamber along with said inner peripheral wall of said first tubular section; and a second set of fingers respectively bendably joined to said first set of fingers and disposed within a plane which is substantially coplanar with said washer and which is transverse to said longitudinal axis so as to close said central bore portion of said first tubular section of said tubular member and thereby cover said head portion of said fastener.

16. The apparatus as set forth in claim 15, wherein said fastener setting tool further comprises:

muzzle means, movably mounted upon said fastener setting tool so as to be movable with respect to said nosepiece portion of said fastener setting tool, for engaging said second set of fingers and bending said second set of fingers toward said first set of fingers so as to permit said fastener setting tool to open said central bore portion of said first tubular section of said tubular member and force said fastener into and through said attachment plate and embed said fastener within said building substrate.

17. The apparatus as set forth in claim 14, wherein said finger means comprises:

a solid band disposed parallel to and circumferentially about said longitudinal axis so as to define said annular chamber along with said inner peripheral wall of said first tubular section; and a set of fingers bendably joined to said solid band and disposed within a plane which is substantially coplanar with said washer and which is transverse to said longitudinal axis so as to close said central bore portion of said first tubular section of said tubular member and thereby cover said head portion of said fastener.

18. The apparatus as set forth in claim 17, wherein said fastener setting tool further comprises:

muzzle means, movably mounted upon said fastener setting tool so as to be movable with respect to said nosepiece portion of said fastener setting tool, for engaging said set of fingers and bending said set of fingers toward said solid band so as to permit said fastener setting tool to open said central bore portion of said first tubular section of said tubular member and force said fastener into and through said attachment plate and embed said fastener within said building substrate.

19. The apparatus as set forth in claims 14, wherein:

said third tubular section of said tubular member has a plurality. of slots formed therein for defining a plurality of flexible tabs upon said third tubular section such that if the axial extent of said tubular member of said attachment plate is greater than the thickness of said insulation panel, said flexible tabs will be bent against said building substrate, when said fastener setting tool is fired so as to insert said at least one fastener into said building substrate, so as to permit an outer surface portion of said washer to be substantially coplanar with an outer surface portion of said insulation panel.

20. Apparatus as set forth in claim 14, wherein:

said fastener setting tool comprises an internal combustion cordless nail setting tool.

* * * * *